United States Patent
Nagaraja et al.

(10) Patent No.: US 11,627,607 B2
(45) Date of Patent: Apr. 11, 2023

(54) TECHNIQUES AND APPARATUSES FOR RANDOM ACCESS RESOURCE INDICATION USING A TIME OFFSET

(71) Applicant: QUALCOMM Incorporated, San Diego, CA (US)

(72) Inventors: Sumeeth Nagaraja, San Diego, CA (US); Hung Dinh Ly, San Diego, CA (US); Tao Luo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 16/123,677

(22) Filed: Sep. 6, 2018

(65) Prior Publication Data

US 2019/0082470 A1  Mar. 14, 2019

Related U.S. Application Data

(60) Provisional application No. 62/556,950, filed on Sep. 11, 2017.

(51) Int. Cl.
*H04L 5/00* (2006.01)
*H04W 36/08* (2009.01)
(Continued)

(52) U.S. Cl.
CPC ....... *H04W 74/0833* (2013.01); *H04L 5/0048* (2013.01); *H04W 36/0077* (2013.01);
(Continued)

(58) Field of Classification Search
CPC ............ H04L 5/0048; H04W 36/0077; H04W 36/08; H04W 56/001; H04W 74/0833; H04W 88/02; H04W 88/08
See application file for complete search history.

(56) References Cited

U.S. PATENT DOCUMENTS 9,119,036 B2    8/2015  Kazmi et al.
2008/0267131 A1*  10/2008  Kangude ........... H04W 36/0072
                                        370/331
(Continued)

FOREIGN PATENT DOCUMENTS

CN    101959230 A    1/2011
CN    102356680 A    2/2012
(Continued)

OTHER PUBLICATIONS

Ericsson: "Further Details of Handover Execution in NR", 3GPP Draft; R2-1700863—Further Details of HO Execution in NR, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13-Feb. 17, 2017, Feb. 12, 2017 (Feb. 12, 2017), 5 Pages, XP051211644, Retrieved from the Internet: URL: http://www.3gpp.org/ftp/Meetings_3GPP_SYNC/RAN2/Docs/ [retrieved on Feb. 12, 2017].
(Continued)

*Primary Examiner* — Melvin C Marcelo
*Assistant Examiner* — Natali Pascual Peguero
(74) *Attorney, Agent, or Firm* — Harrity & Harrity LLP/Qualcomm Incorporated

(57) ABSTRACT

Certain aspects of the present disclosure generally relate to wireless communication. In some aspects, a user equipment may provide information identifying a first time offset between a first time associated with a measurement performed by the user equipment and a second time associated with a measurement gap or a time value of a serving cell of the user equipment, receive information identifying a second time offset between the second time and a third time, wherein the second time offset is based at least in part on the first time offset, and/or transmit a random access message at the third time based at least in part on the second time offset.

(Continued)

A scheduling entity may coordinate a random access procedure associated with the random access message based at least in part on the second time offset. Numerous other aspects are provided.

30 Claims, 9 Drawing Sheets

(51) Int. Cl.
*H04W 74/08* (2009.01)
*H04W 56/00* (2009.01)
*H04W 36/00* (2009.01)
*H04W 88/02* (2009.01)
*H04W 88/08* (2009.01)

(52) U.S. Cl.
CPC ......... *H04W 36/08* (2013.01); *H04W 56/001* (2013.01); *H04W 88/02* (2013.01); *H04W 88/08* (2013.01)

(56) References Cited

U.S. PATENT DOCUMENTS

| | | | | |
|---|---|---|---|---|
| 2011/0310852 | A1* | 12/2011 | Dimou | ................. H04W 36/08 370/332 |
| 2015/0282215 | A1 | 10/2015 | Eriksson et al. | |

FOREIGN PATENT DOCUMENTS

| | | | |
|---|---|---|---|
| CN | 105580436 A | 5/2016 | |
| CN | 106559109 A | 4/2017 | |
| WO | WO-2008137328 A2 | 11/2008 | |
| WO | 2014098538 A1 | 6/2014 | |
| WO | WO-2017022902 A1 * | 2/2017 | .............. H04W 8/24 |

OTHER PUBLICATIONS

Huawei, et al., "Allocation of Appropriate RACH Resources for Handover", 3GPP Draft; R2-1706714 Allocation of Appropriate RACH Resources for Handover, 3rd Generation Partnership Project (3GPP), Mobile Competence Centre; 650, Route Des Lucioles; F-06921 Sophia-Antipolis, vol. RAN WG2, No. Qingdao, China; Jun. 27-Jun. 29, 2017, Jun. 26, 2017 (Jun. 26, 2017), 6 Pages, XP051301214, Retrieved from the Internet: URL: http://www.3gpp.org/ftp/Meetings_3GPP_SYNC/RAN2/Docs/ [retrieved on Jun. 26, 2017].
International Search Report and Written Opinion—PCT/US2018/049836—ISA/EPO—dated Oct. 26, 2018.
Qualcomm Incorporated: "4-Step RACH Procedure Consideration", 3GPP TSG-RAN WG1 #88bis, R1-1705572, Apr. 3-7, 2017 Spokane, USA, pp. 1-11.
Taiwan Search Report—TW107131471—TIPO—dated Sep. 28, 2021.

* cited by examiner

TECHNIQUES AND APPARATUSES FOR RANDOM ACCESS RESOURCE INDICATION USING A TIME OFFSET

CROSS-REFERENCE TO RELATED APPLICATIONS UNDER 35 U.S.C. § 119

This application claims priority to U.S. Provisional Patent Application No. 62/556,950, filed on Sep. 11, 2017, entitled "TECHNIQUES AND APPARATUSES FOR RANDOM ACCESS RESOURCE INDICATION USING A TIME OFFSET," which is hereby expressly incorporated by reference herein.

FIELD OF THE DISCLOSURE

Aspects of the present disclosure generally relate to wireless communication and to techniques and apparatuses for random access resource indication using a time offset.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the base station (BS) to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method for wireless communication performed by a user equipment may include providing information identifying a first time offset between a first time associated with a measurement performed by the user equipment and a second time associated with a measurement gap or a time value of a serving cell of the user equipment, receiving information identifying a second time offset between the second time and a third time, wherein the second time offset is based at least in part on the first time offset, and transmitting a random access message at the third time based at least in part on the second time offset.

In some aspects, a user equipment for wireless communication may include a memory and one or more processors operatively coupled to the memory, wherein the memory and the one or more processors are configured to provide information identifying a first time offset between a first time associated with a measurement performed by the user equipment and a second time associated with a measurement gap or a time value of a serving cell of the user equipment, receive information identifying a second time offset between the second time and a third time, wherein the second time offset is based at least in part on the first time offset, and transmit a random access message at the third time based at least in part on the second time offset.

In some aspects, a non-transitory computer-readable medium may store one or more instructions for wireless communication. The one or more instructions, when executed by one or more processors of a user equipment, may cause the one or more processors to provide information identifying a first time offset between a first time associated with a measurement performed by the user equipment and a second time associated with a measurement gap or a time value of a serving cell of the user equipment, receive information identifying a second time offset between the second time and a third time, wherein the second time offset is based at least in part on the first time offset, and transmit a random access message at the third time based at least in part on the second time offset.

In some aspects, an apparatus for wireless communication may include means for providing information identifying a first time offset between a first time associated with a measurement performed by the apparatus and a second time associated with a measurement gap or a time value of a serving cell of the apparatus, means for receiving information identifying a second time offset between the second time and a third time, wherein the second time offset is based at least in part on the first time offset, and means for transmitting a random access message at the third time based at least in part on the second time offset.

In some aspects, a method for wireless communication performed by a scheduling entity may include receiving information identifying a first time offset between a first time associated with a measurement regarding a beam received by a user equipment and a second time associated with a measurement gap or a time value of a serving cell of the user equipment, configuring a random access procedure for a base station that provides the beam based at least in part on the first time offset, wherein the random access procedure is configured to cause the random access procedure to be performed after a second time offset that is based at least in part on the first time offset, and providing information identifying the second time offset to the user equipment for performance of the random access procedure.

In some aspects, a scheduling entity for wireless communication may include a memory and one or more processors operatively coupled to the memory, wherein the memory and the one or more processors are configured to receive information identifying a first time offset between a first time associated with a measurement regarding a beam received by a user equipment and a second time associated with a measurement gap or a time value of a serving cell of the user equipment, configure a random access procedure for a base station that provides the beam based at least in part on the first time offset, wherein the random access procedure is configured to cause the random access procedure to be performed after a second time offset that is based at least in part on the first time offset, and provide information identifying the second time offset to the user equipment for performance of the random access procedure.

In some aspects, a non-transitory computer-readable medium may store one or more instructions for wireless communication. The one or more instructions, when executed by one or more processors of a scheduling entity, may cause the one or more processors to receive information identifying a first time offset between a first time associated with a measurement regarding a beam received by a user equipment and a second time associated with a measurement gap or a time value of a serving cell of the user equipment, configure a random access procedure for a base station that provides the beam based at least in part on the first time offset, wherein the random access procedure is configured to cause the random access procedure to be performed after a second time offset that is based at least in part on the first time offset, and provide information identifying the second time offset to the user equipment for performance of the random access procedure.

In some aspects, an apparatus for wireless communication may include means for receiving information identifying a first time offset between a first time associated with a measurement regarding a beam received by a user equipment and a second time associated with a measurement gap or a time value of a serving cell of the user equipment, means for configuring a random access procedure for a base station that provides the beam based at least in part on the first time offset, wherein the random access procedure is configured to cause the random access procedure to be performed after a second time offset that is based at least in part on the first time offset, and means for providing information identifying the second time offset to the user equipment for performance of the random access procedure.

Aspects generally include a method, apparatus, system, computer program product, non-transitory computer-readable medium, user equipment, scheduling entity, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
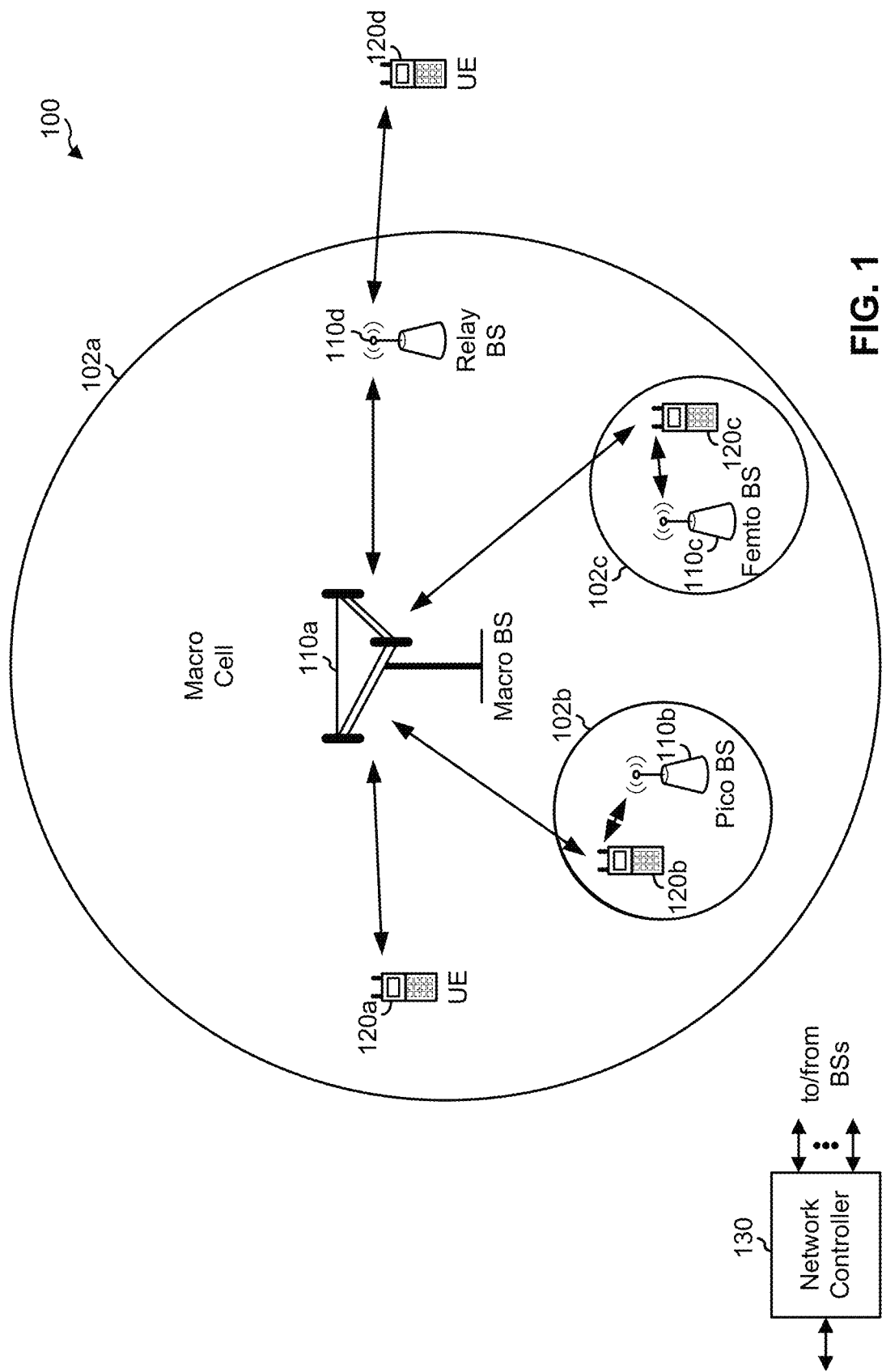
FIG. 1 is a block diagram conceptually illustrating an example of a wireless communication network, in accordance with various aspects of the present disclosure.

During handover, a scheduling entity may provide measurement gaps for a UE to perform cell measurements regarding target cells (e.g., beams associated with target cells). In the measurement gaps, the UE may perform measurements of one or more beams from serving and/or neighbor cells. Upon detecting a beam of a cell, the UE can easily determine the symbol timing, but not the slot or frame boundary of the cell in some instances. Also, the UE may not be aware of the system frame number (SFN) of the cell. Therefore, the UE may not know the timing of the neighbor cell, which may be problematic when the neighbor cell is asynchronous with the serving cell. Hence, the UE may not know the time at which random access resources are scheduled for the target cell, and may not be able to correctly send a random access message or random access channel (RACH) on the target cell. One approach is for the UE to decode a physical broadcast channel (PBCH) of the target cell to determine the slot and frame boundary, thereby enabling proper RACH timing. However, this may incur additional cost of decoding the PBCH of one or more neighbor cells.

Techniques and apparatuses described herein provide for coordination of a random access procedure between a UE and a target cell (e.g., and/or a base station associated with the target cell) by identifying a time offset from a measurement gap of the UE and/or a system time value of a serving cell to a particular time, and by configuring the UE and the target cell to perform the RACH procedure at the particular time. In other words, the time offset is identified from a time that is known to the UE, so the UE does not need to know timing of the target cell to perform the random access procedure. In this way, latency of the random access procedure is decreased and system resources of the UE are conserved that would otherwise be used to decode the PBCH and determine timing of the target cell using the PBCH. Notably, this technique can be performed for multiple, different beams and multiple, different target cells, which further increases efficiency of the random access procedure by avoiding the determination of timing for the multiple, different target cells.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. As one example, the scheduling entity may configure a random access procedure with regard to one or more UEs and one or more base stations, as described elsewhere herein. For example, the scheduling entity may receive information identifying a first time offset between a first time associated with a measurement regarding a beam received by a user equipment and a second time associated with a measurement gap or a time value of a serving cell of the user equipment; configure a random access procedure for a base station that provides the beam based at least in part on the first time offset, wherein the random access procedure is configured to cause the random access procedure to be performed after a second time offset that is based at least in part on the first time offset; and provide information identifying the second time offset to the user equipment for performance of the random access procedure.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
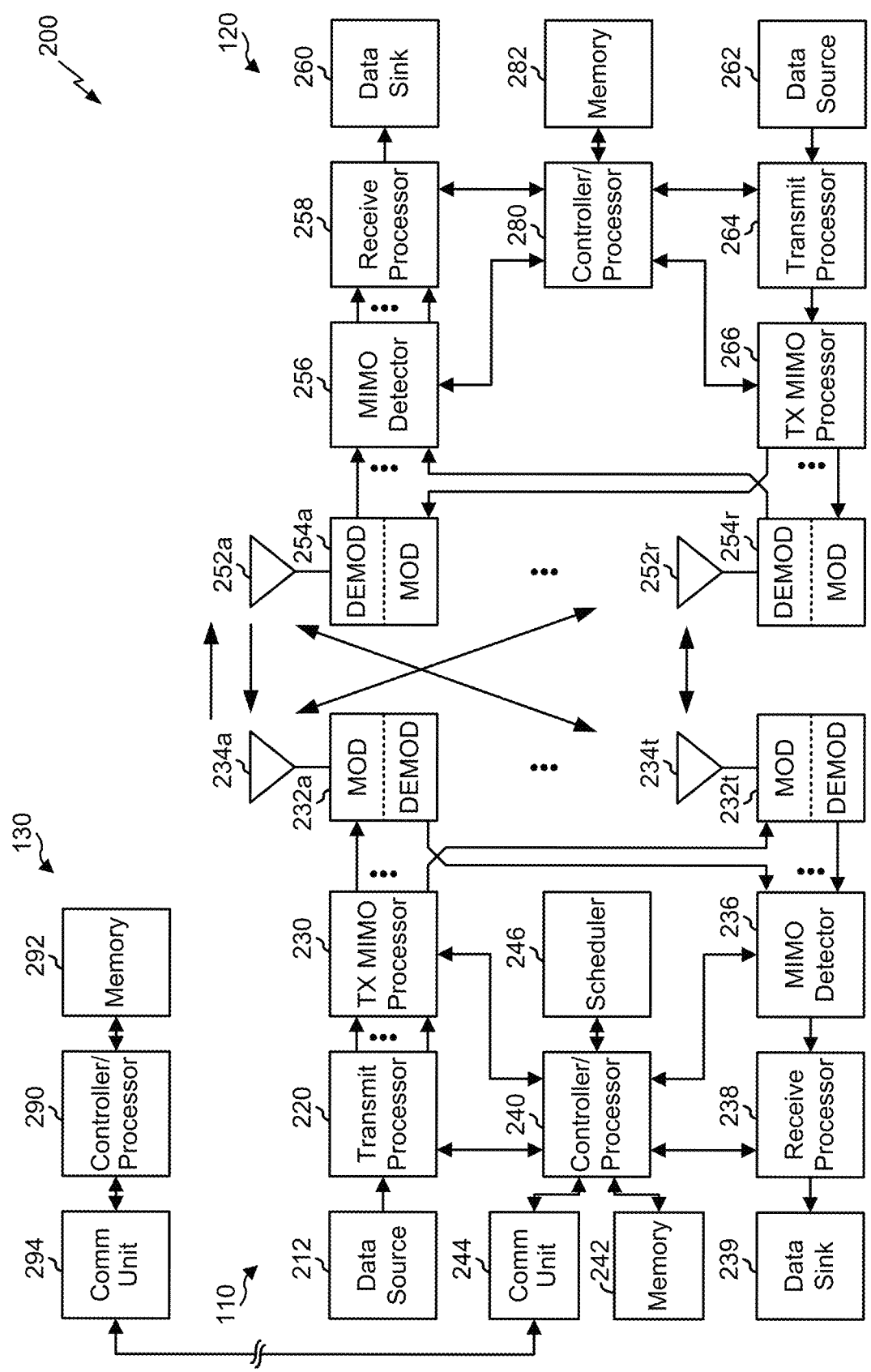
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals and/or random access messages. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information (e.g., random access messages and/or the like) sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292. In some aspects, network controller 130 may function as a scheduling entity. In some aspects, one or more components of UE 120 may be included in a housing.

Controllers/processors 240 and 280 and/or any other component(s) in FIG. 2 may direct the operation at BS 110 and UE 120, respectively, to perform random access resource indication using a time offset. For example, controller/processor 280 and/or other processors and modules at UE 120, may perform or direct operations of UE 120 to perform random access resource indication using a time offset. For example, controller/processor 280 and/or other controllers/processors and modules at UE 120 may perform or direct operations of, for example, process 800 of FIG. 8 and/or other processes as described herein. Additionally, or alternatively, controller/processor 240 and/or other processors and modules at BS 110, may perform or direct operations of BS 110 to perform random access resource indication using a time offset. For example, controller/processor 240 and/or other controllers/processors and modules at BS 110 may perform or direct operations of, for example, process 900 of FIG. 9 and/or other processes as described herein. In some aspects, one or more of the components shown in FIG. 2 may be employed to perform example process 800, example process 900, and/or other processes for the techniques described herein.

Memories 242 and 282 may store data and program codes for BS 110 and UE 120, respectively. The stored program codes, when executed by controller/processor 280 and/or other processors and modules at UE 120, may cause the UE 120 to perform operations described with respect to process 800 of FIG. 8 and/or other processes as described herein. The stored program codes, when executed by processor 240 and/or other processors and modules at BS 110, may cause the BS 110 to perform operations described with respect to process 900 of FIG. 9 and/or other processes as described herein. A scheduler 246 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 may include means for providing information identifying a first time offset between a first time associated with a measurement performed by the UE 120 and a second time associated with a measurement gap or a time value of a serving cell of the UE 120, means for receiving information identifying a second time offset between the second time and a third time, wherein the second time offset is based at least in part on the first time offset, means for transmitting a random access message at the third time based at least in part on the second time offset, and/or the like. In some aspects, such means may include one or more components of UE 120 described in connection with FIG. 2.

In some aspects, BS 110 (or a scheduling entity associated with BS 110 or UE 120) may include means for receiving information identifying a first time offset between a first time associated with a measurement regarding a beam received by a UE 120 and a second time associated with a measurement gap or a time value of a serving cell of the user equipment, means for configuring a random access procedure for a base station (the BS 110 or another base station) that provides the beam based at least in part on the first time offset, means for providing information identifying the second time offset to the UE 120 for performance of the random access procedure, means for configuring the base station to scan for a random access message at a particular time relative to the measurement gap or the time value, means for receiving second information identifying another first time offset for a second beam, means for configuring a second random access procedure with regard to the second beam based at least in part on another second time offset, means for providing information identifying the second time offset for performance of the second random access procedure, and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3:
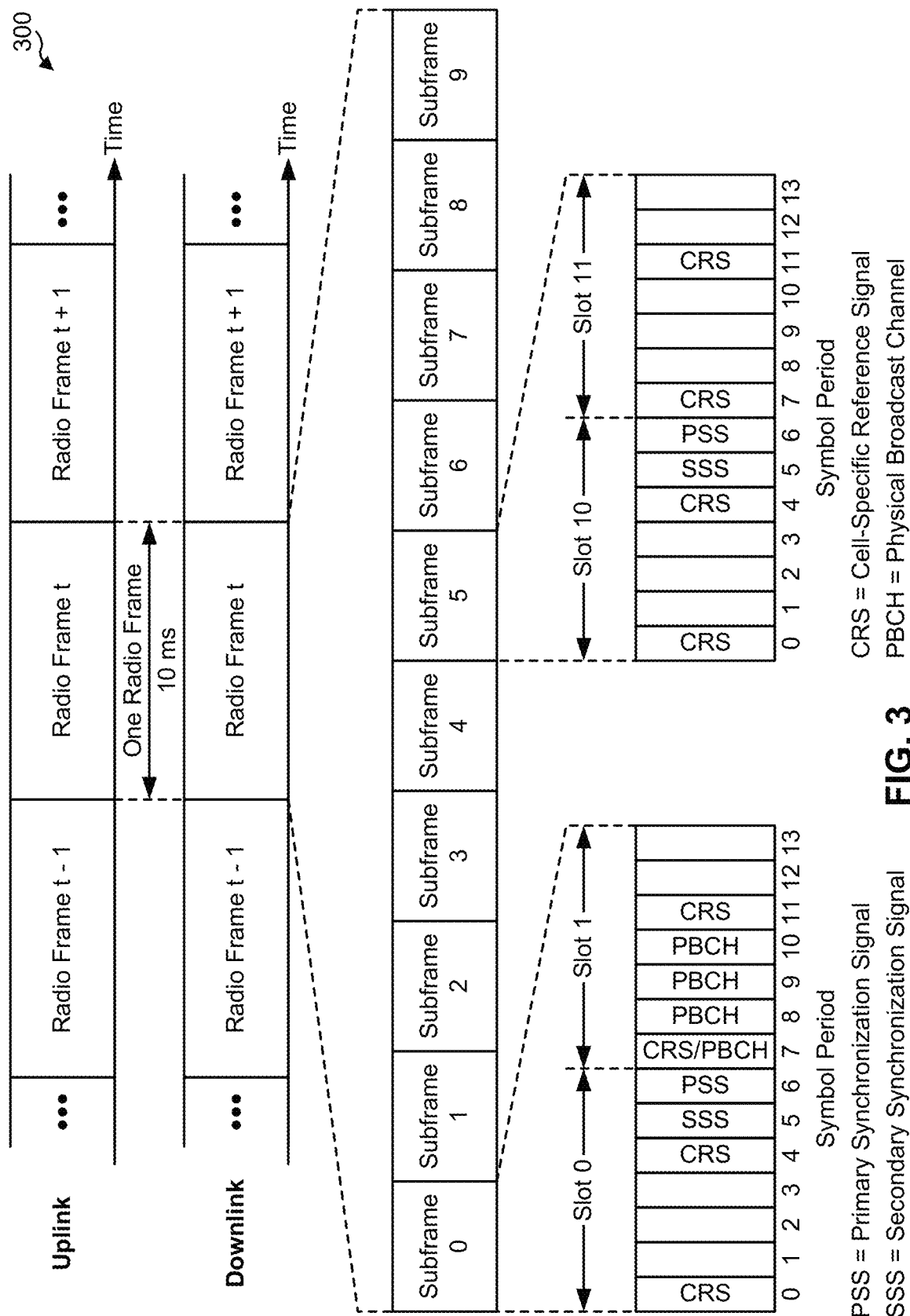
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L-1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. Some techniques and apparatuses described herein may provide for scheduling of RACH communications without reading the PBCH for a particular cell based at least in part on one or more time offsets. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as NR or 5G systems), a Node B may transmit these or other signals (e.g., a synchronization signal block, a tracking reference signal, and/or the like) in these locations or in different locations of the subframe.

As indicated above, FIG. 3 is provided merely as an example. Other examples are possible and may differ from what was described with regard to FIG. 3.

Figure 4:
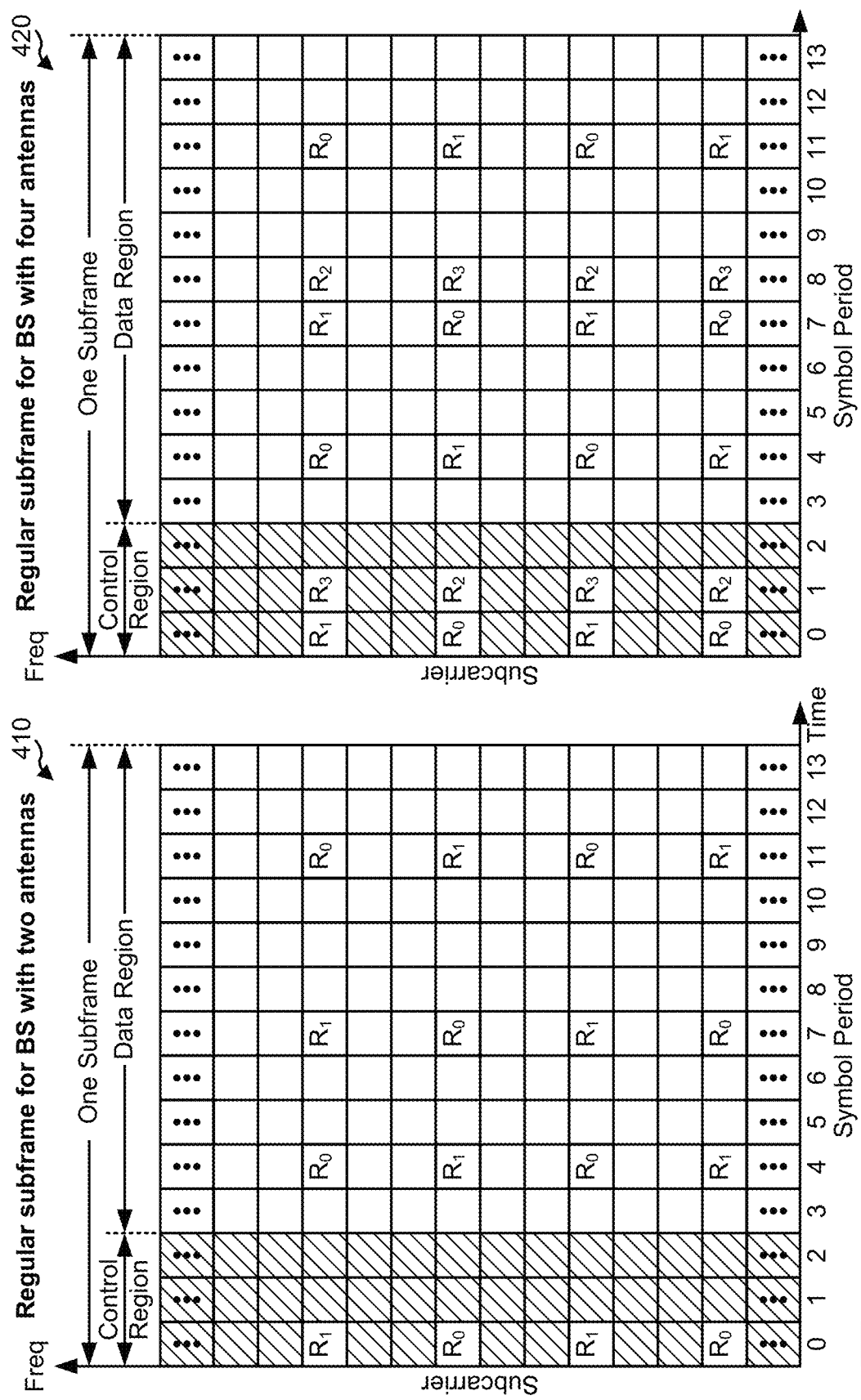
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched.

Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. A CU and/or NR BS may be a scheduling entity as described herein. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
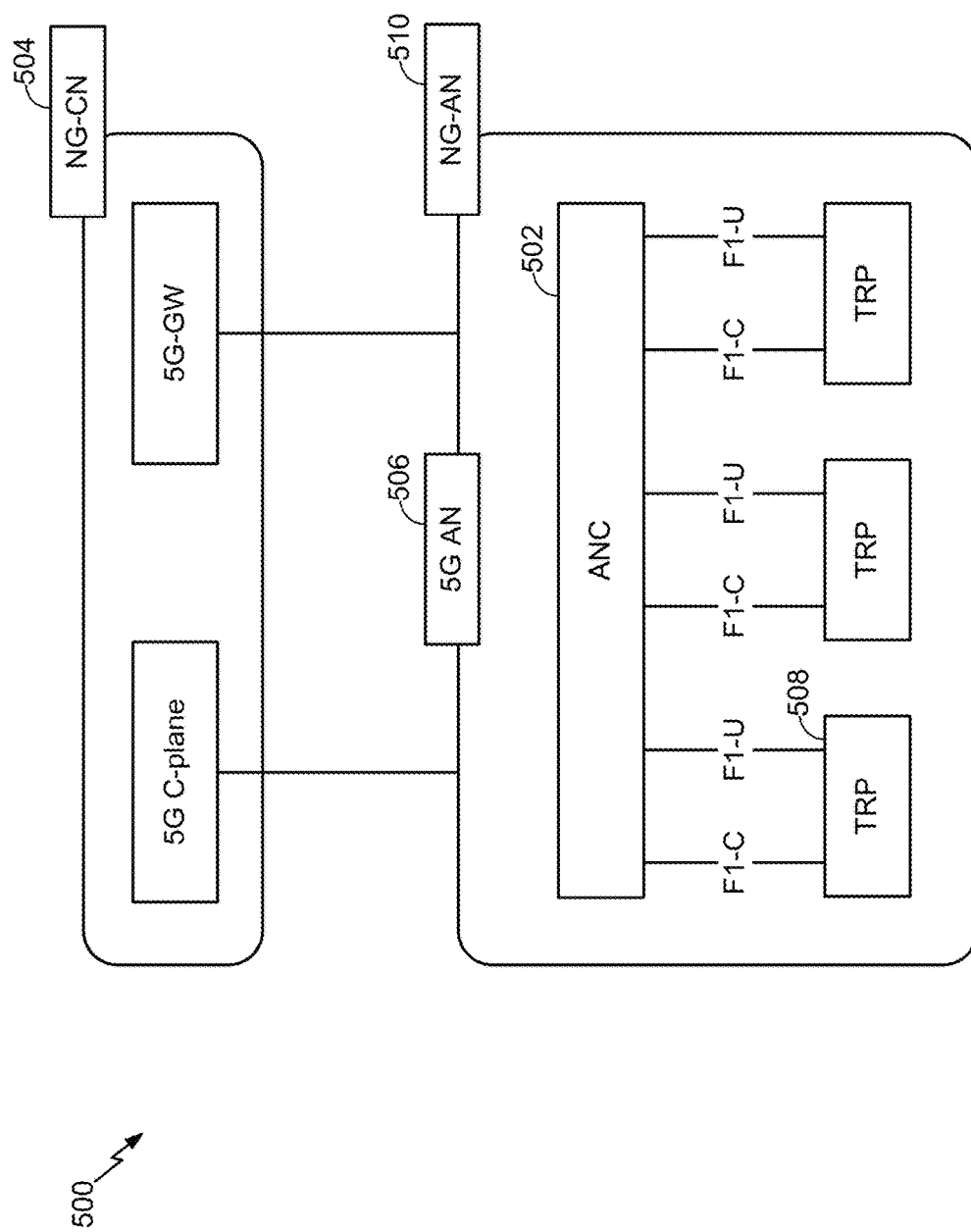
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
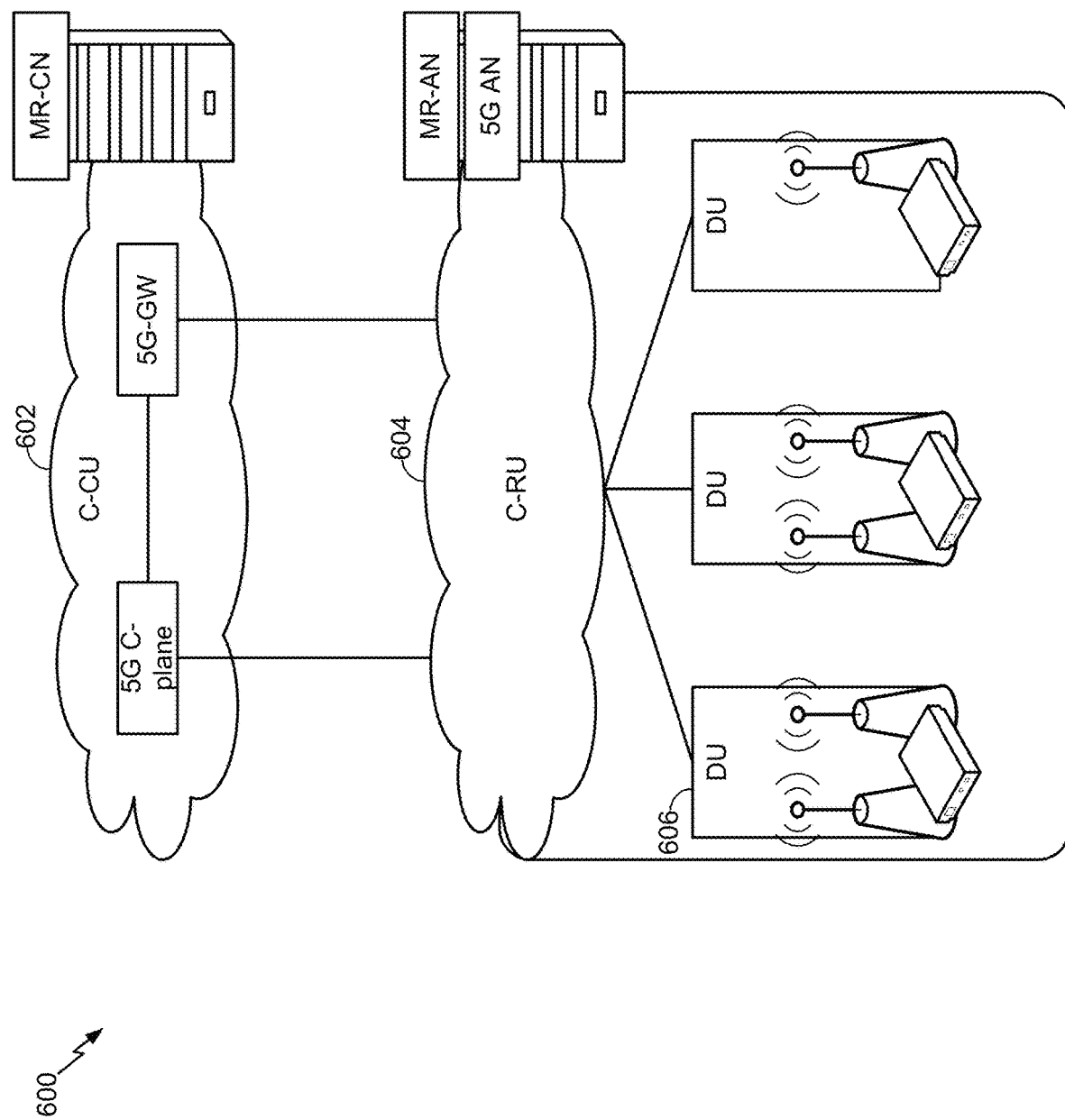
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
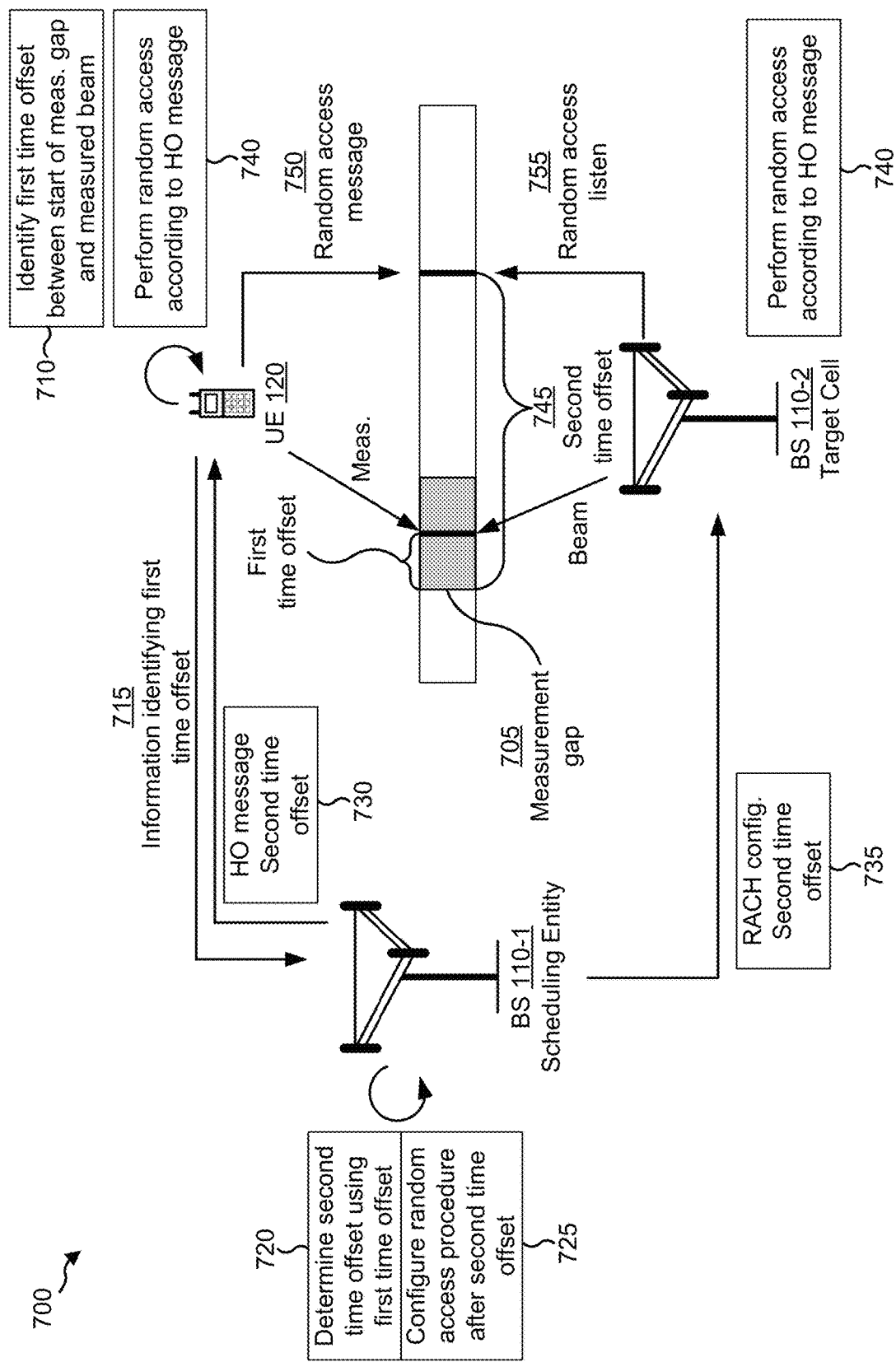
FIG. 7 is a diagram illustrating an example of random access resource indication using a time offset, in accordance with various aspects of the present disclosure.

FIG. 7 is a diagram illustrating an example 700 of random access resource indication using a time offset, in accordance with various aspects of the present disclosure. As shown, FIG. 7 includes a BS 110-1. BS 110-1 is a scheduling entity for a UE 120 and for a BS 110-2. For example, the BS 110-2 provides a target cell for which the UE 120 is to perform a random access procedure based at least in part on the techniques and apparatuses described herein (e.g., based at least in part on a second time offset, as described in more detail below).

As shown by reference number 705, the UE 120 may perform a measurement in a measurement gap. For example, the BS 110-1 may configure the UE 120 to perform the measurement in the measurement gap, and the BS 110-2 may provide a beam in the measurement gap, as shown. In some aspects, the measurement gap may be defined in terms of a number of symbols, a number of slots, an SFN, and/or a combination of the above values. Additionally, or alternatively, the measurement gap may be associated with a periodicity. For example, the UE 120 may perform a measurement periodically.

The UE 120 may determine a measurement for the beam, and may identify the BS 110-2 and/or the target cell based at least in part on the beam. By performing the measurement, the UE 120 may determine a symbol timing of the BS 110-2. However, the UE 120 may not know an SFN or a frame timing of the BS 110-2. Therefore, without more information, the RACH procedure of the UE 120 with regard to the BS 110-2 may fail.

As shown by reference number 710, the UE 120 may identify a first time offset based at least in part on the measured beam. The first time offset may be between a first time of the measurement performed by the UE 120 with regard to the beam and a second time. In some aspects, the second time may be associated with a start of the measurement gap. In some aspects, the second time may be associated with an end of the measurement gap. In some aspects, the second time may be associated with a timing of a serving cell of the UE 120, such as a frame timing, a subframe timing, an SFN, etc. Additionally, or alternatively, the second time may be based at least in part on some other time known to the UE 120 and the BS 110-1.

In some aspects, the first time offset may be defined in terms of a number of symbols, a number of slots, an SFN, and/or a combination of the above values. Additionally, or alternatively, the first time offset may identify a sub-symbol timing difference. For example, if the target cell is associated with a sub-symbol timing difference from the serving cell, the first time offset may take into account the sub-symbol timing difference.

In some aspects, the UE 120 may determine multiple first time offsets for multiple beams. In some aspects, the multiple beams may be provided by multiple, different cells. By determining the multiple first time offsets, the UE 120 can be configured to perform RACH with regard to the multiple, different cells without knowing SFNs of the multiple, different cells, as described in more detail below.

As shown by reference number 715, the UE 120 may provide information identifying the first time offset to the BS 110-1. For example, the UE 120 may provide a report identifying the first time offset and/or identifying the beam and/or BS 110-2 for which the measurement was performed. In some aspects, when the UE 120 determines multiple, different first time offsets, the UE 120 may provide information identifying multiple, different first time offsets (e.g., all first time offsets, first time offsets for a set of one or more best cells, etc.).

As shown by reference number 720, the BS 110-1 may determine a second time offset using the first time offset. The second time offset may be relative to the second time. For example, the second time offset may be between the second time and a third time. The third time may be a time associated with a random access procedure to be performed by the UE 120 with regard to the BS 110-2. As one example, the third time may be a time at which the UE 120 is to transmit a random access message, such as a RACH MSG1. By determining the second time offset, the BS 110-1 uses information that is known to the UE 120 and the BS 110-1 (e.g., the second time) to determine an appropriate time for the RACH procedure.

As shown by reference number 725, the BS 110-1 may configure the random access procedure to be performed after the second time offset. For example, and as shown by reference number 730, the BS 110-1 may provide a handover (HO) message to the UE 120 identifying the second time offset. In some aspects, the HO message may also identify the BS 110-2, and may indicate to transmit the random access message to the BS 110-2 after the second time offset has occurred. In some aspects, the HO message may identify a RACH format for the random access message.

As shown by reference number 735, the BS 110-1 may further configure the random access procedure by providing an indication to the BS 110-2 of the second time offset. For example, the BS 110-1 may configure the BS 110-2 to listen for the random access message during the second time offset. The BS 110-1 may provide information identifying a start time associated with the second time offset (e.g., the second time) and may provide information identifying a length of the second time offset. For example, the information identifying the start time and/or length may be in terms of symbol length, slot number, SFN, sub-symbol timing value, and/or the like.

In some aspects, the random access procedure may be periodic. For example, the BS 110-1 may configure the UE 120 to transmit the random access message periodically. Additionally, or alternatively, the BS 110-1 may configure the BS 110-2 to listen for the random access message periodically. In such a case, the second time offset may be associated with a periodicity.

As shown by reference numbers 740, the UE 120 and the BS 110-2 may perform the random access procedure according to the HO message. For example, the UE 120 may wait until the second time offset (shown by reference number 745) has lapsed, and may transmit a random access message for the BS 110-2 after the second time offset has lapsed (shown by reference number 750). In some aspects, the UE 120 may transmit multiple random access messages. For example, when the UE 120 has identified multiple first time offsets for multiple beams, and when the UE 120 has received multiple second time offsets corresponding to the multiple first time offsets, the UE 120 may transmit respective random access messages for each of the multiple beams.

In some aspects, the UE 120 may transmit the random access message based at least in part on the beam for which the measurement was performed. For example, there may be a beam correspondence between the beam for which the measurement was performed and a transmit beam of the UE 120. In that case, the UE 120 may use the transmit beam to transmit the random access message. This may save radio resources that would otherwise be used to specify which beam the UE 120 is to use to transmit the random access message.

As shown by reference number 755, the BS 110-2 may listen or scan for the random access message based at least in part on the second time offset. For example, the BS 110-1 may configure the BS 110-2 to listen for the random access message after the second time offset has lapsed. In this way, the random access procedure between the UE 120 and the BS 110-2 is coordinated without the UE 120 needing to decode a PBCH of the BS 110-2. Thus, latency of the random access procedure is reduced and resources of the UE 120 are conserved that would otherwise be used to find and decode the PBCH.

In some aspects, the BS 110-1 may be the same BS as the BS 110-2. For example, the scheduling entity may be associated with the target cell. In some aspects, the BS 110-1 may provide a serving cell of the UE 120. Additionally, or alternatively, the BS 110-1 may be separate from the serving cell and the target cell of the UE 120.

In some aspects, the first time offset may be associated with a timing ambiguity. For example, the UE 120 may not always be capable of determining whether the UE 120 has performed a measurement in the first half of a frame or the second half of a frame. Therefore, it may be difficult for the BS 110-1 to determine whether the second time offset should be configured as an offset for a first half of the frame or for a second half of the frame. In such a case, the BS 110-1 may configure multiple second time offsets. For example, the BS 110-1 may configure one second time offset for the UE 120 to provide the random access message in the first half of the frame, and may configure another second time offset for the UE 120 to provide the random access message in the second half of the frame. In this way, the UE 120 may provide random access messages in both halves of a frame when timing ambiguity exists, thereby improving likelihood of success of random access.

In some aspects, the BS 110-1 may schedule a reference signal based at least in part on a time offset. For example, the BS 110-1 may determine a third time offset. The third time offset may be between the second time and a fourth time at which a reference signal is to be transmitted by the BS 110-2. The reference signal may be, for example, a channel state information reference signal (CSI-RS). The BS 110-1 may provide information identifying the third time offset to the UE 120 and the BS 110-2. In this way, the BS 110-2 can be configured to provide a reference signal at a particular time, and the UE 120 may be configured to receive the reference signal, without the UE 120 needing to know timing information associated with the BS 110-2. Furthermore, the third time offset can be determined for multiple different BSs 110 (e.g., corresponding to multiple different beams) as described in more detail elsewhere herein.

As indicated above, FIG. 7 is provided as an example. Other examples are possible and may differ from what was described with respect to FIG. 7.

Figure 8:
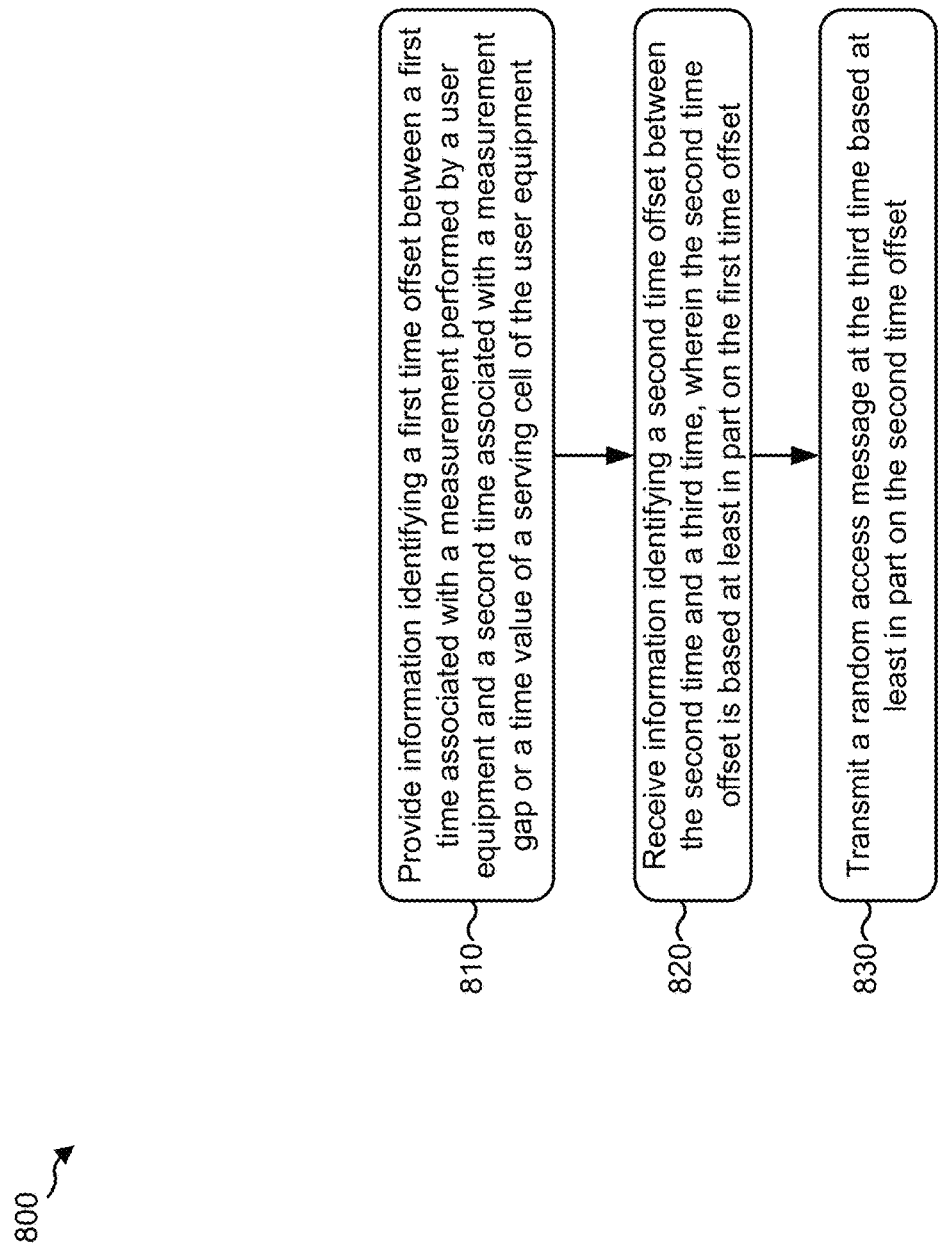
FIG. 8 is a diagram illustrating an example process performed, for example, by a user equipment, in accordance with various aspects of the present disclosure.

FIG. 8 is a diagram illustrating an example process 800 performed, for example, by a user equipment, in accordance with various aspects of the present disclosure. Example process 800 is an example where a user equipment (e.g., UE 120) performs random access resource indication using a time offset.

As shown in FIG. 8, in some aspects, process 800 may include providing information identifying a first time offset between a first time associated with a measurement performed by the user equipment and a second time associated with a measurement gap or a time value of a serving cell of the user equipment (block 810). For example, the user equipment (e.g., using controller/processor 280 and/or the like) may determine a first time offset between a first time and a second time. The first time may be associated with a measurement performed by the user equipment (e.g., with regard to one or more beams). The second time may be associated with a measurement gap (e.g., a start or end of the measurement gap) or a time value of a serving cell (e.g., slot, frame, subframe, sub-symbol timing, etc.). The user equipment may provide information identifying the first time offset to a scheduling entity.

As shown in FIG. 8, in some aspects, process 800 may include receiving information identifying a second time offset between the second time and a third time, wherein the second time offset is based at least in part on the first time offset (block 820). For example, the user equipment (e.g., using antenna 252, DEMOD 254, MIMO detector 256, receive processor 258, controller/processor 280, and/or the like) may receive information identifying a second time offset that is based at least in part on the first time offset. The second time offset may be between the second time and a third time. As described below, the third time may be a time at which a random access procedure is to be performed and/or a random access message is to be transmitted by the user equipment.

As shown in FIG. 8, in some aspects, process 800 may include transmitting a random access message at the third time based at least in part on the second time offset (block 830). For example, the user equipment (e.g., using controller/processor 280, transmit processor 264, TX MIMO processor 266, MOD 254, antenna 252, and/or the like) may transmit a random access message at the third time. In some aspects, the user equipment may transmit multiple random access messages. For example, the user equipment may transmit random access messages periodically. Additionally, or alternatively, the user equipment may transmit random access messages to multiple base stations (e.g., associated with different beams and/or cells). In this way, a random access procedure between the user equipment and the base station is configured based at least in part on the first time offset and the second time offset, which means that the user equipment does not need to fully synchronize, determine a PBCH, and/or determine a system timing of the base station before performing the random access procedure.

Process 800 may include additional aspects, such as any single aspect or any combination of aspects described below and/or in connection with one or more other processes described elsewhere herein.

In some aspects, the time value is based at least in part on at least one of a frame timing, slot timing, or symbol timing of the serving cell. In some aspects, the first time offset is based at least in part on a sub-symbol timing difference between the first time and the second time. In some aspects, the measurement is performed with regard to a beam, and wherein the random access message is transmitted using the beam. In some aspects, the information identifying the second time offset is received in a handover command. In some aspects, the information identifying the second time offset identifies at least one of a periodicity for the random access message or a format for the random access message. In some aspects, the user equipment may receive information identifying a third time offset between the second time and a fourth time at which a reference signal is to be received, and scan for the reference signal at the fourth time based at least in part on the third time offset.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
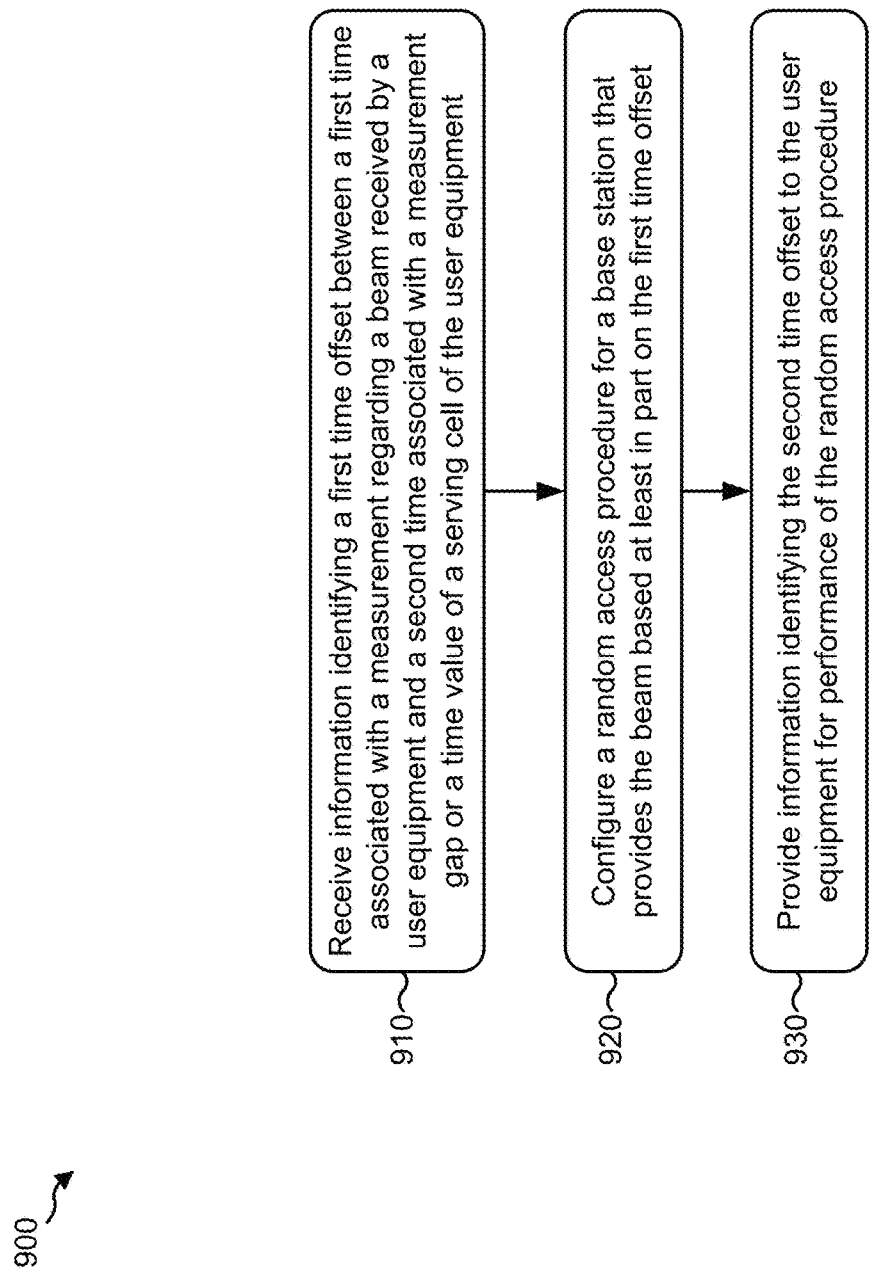
FIG. 9 is a diagram illustrating an example process performed, for example, by a scheduling entity, in accordance with various aspects of the present disclosure.

FIG. 9 is a diagram illustrating an example process 900 performed, for example, by a scheduling entity, in accordance with various aspects of the present disclosure. Example process 900 is an example where a scheduling entity (e.g., BS 110, the scheduling entity described in connection with FIG. 1, UE 120, and/or the like) performs random access resource indication using a time offset.

As shown in FIG. 9, in some aspects, process 900 may include receiving information identifying a first time offset between a first time associated with a measurement regarding a beam received by a user equipment and a second time associated with a measurement gap or a time value of a serving cell of the user equipment (block 910). For example, the scheduling entity (e.g., using antenna 234, DEMOD 232, MIMO detector 236, receive processor 238, controller/processor 240, and/or the like) may receive information identifying a first time offset between a first time and a second time. The information identifying the first time offset may be received from a user equipment. The first time may be associated with a measurement (e.g., one or more measurements) regarding a beam (e.g., one or more beams) received by the user equipment. The second time may be associated with a measurement gap or time value of a serving cell of the user equipment. In some aspects, the serving cell may be provided by a base station associated with the scheduling entity. Additionally, or alternatively, the scheduling entity may be associated with a target cell associated with the beam. Additionally, or alternatively, the scheduling entity may be separate from the serving cell and the target cell.

As shown in FIG. 9, in some aspects, process 900 may include configuring a random access procedure for a base station that provides the beam based at least in part on the first time offset (block 920). For example, the scheduling entity (e.g., using controller/processor 240, transmit processor 220, TX MIMO processor 230, MOD 232, antenna 234, and/or the like) may configure a random access procedure for a base station (e.g., one or more base stations) that provides the beam (e.g., the one or more beams) based at least in part on the first time offset. The scheduling entity may configure the random access procedure by configuring the user equipment to provide a random access message, and by configuring the base station to listen for or scan for the random access message, based at least in part on a second time offset relative to the second time.

As shown in FIG. 9, in some aspects, process 900 may include providing information identifying a second time offset to the user equipment for performance of the random access procedure (block 930). For example, the scheduling entity (e.g., using controller/processor 240, transmit processor 220, TX MIMO processor 230, MOD 232, antenna 234, and/or the like) may provide information identifying a second time offset to the user equipment for performance of the random access procedure. In some aspects, the scheduling entity may provide the information in a handover command. The user equipment may transmit a random access message based at least in part on the second time offset, and the base station (e.g., target cell) may listen for the random access message based at least in part on the second time offset. In this way, the user equipment does not need to know a system timing of the base station to perform random access with the base station (e.g., target cell), which reduces random access latency.

Process 900 may include additional aspects, such as any single aspect or any combination of aspects described below and/or in connection with one or more other processes described elsewhere herein.

In some aspects, the second time offset is between the second time and a time at which the random access procedure is performed. In some aspects, configuring the random access procedure comprises configuring the base station to scan for a random access message at a particular time relative to the measurement gap or the time value. In some aspects, the base station is configured to scan for the random access message at two or more times. In some aspects, configuring the random access procedure comprises configuring the user equipment to transmit a random access message at two or more times.

In some aspects, the information identifying the first time offset is first information identifying one first time offset for a first beam, the information identifying the second time offset is first information identifying one second time offset for the first beam, and the random access procedure is a first random access procedure. The scheduling entity may receive second information identifying another first time offset for a second beam, configure a second random access procedure with regard to the second beam based at least in part on another second time offset, and provide information identifying the second time offset for performance of the second random access procedure. In some aspects, the second random access procedure is configured between the base station and the user equipment. In some aspects, the base station is a first base station, and the second random access procedure is configured between the user equipment and a second base station. In some aspects, the base station is a target base station for a handover of the user equipment. In some aspects, the information identifying the second time offset is provided in a handover message. In some aspects, the scheduling entity is the base station. In some aspects, the scheduling entity may determine a third time offset between the second time and a fourth time at which a reference signal is to be transmitted by the base station, and provide information identifying the third time offset to the base station and the user equipment.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
   providing information identifying a first time offset between a first time associated with a measurement performed by the user equipment and a second time associated with a measurement gap or a time value of a serving cell of the user equipment;
   receiving information identifying a second time offset between the second time and a third time, wherein the second time offset is based at least in part on the first time offset,
      wherein the information identifying the second time offset identifies a periodicity for a random access message; and
   transmitting the random access message at the third time based at least in part on the second time offset.

2. The method of claim 1, wherein the time value is based at least in part on at least one of a frame timing, slot timing, or symbol timing of the serving cell.

3. The method of claim 1, wherein the first time offset is based at least in part on a sub-symbol timing difference between the first time and the second time.

4. The method of claim 1, wherein the measurement is performed with regard to a beam, and wherein the random access message is transmitted using the beam.

5. The method of claim 1, wherein the information identifying the second time offset is received in a handover command.

6. The method of claim 1, wherein the information identifying the second time offset identifies a format for the random access message.

7. The method of claim 1, further comprising:
   receiving information identifying a third time offset between the second time and a fourth time at which a reference signal is to be received; and
   scanning for the reference signal at the fourth time based at least in part on the third time offset.

8. A method of wireless communication performed by a scheduling entity, comprising:
   receiving information identifying a first time offset between a first time associated with a measurement regarding a beam received by a user equipment and a second time associated with a measurement gap or a time value of a serving cell of the user equipment;
   configuring a random access procedure for a base station that provides the beam based at least in part on the first time offset,
      wherein the random access procedure is configured to cause the random access procedure to be performed after a second time offset that is based at least in part on the first time offset; and
   providing information identifying the second time offset to the user equipment for performance of the random access procedure,
      wherein the information identifying the second time offset identifies a periodicity for a random access message.

9. The method of claim 8, wherein the second time offset is between the second time and a time at which the random access procedure is performed.

10. The method of claim 8, wherein configuring the random access procedure comprises configuring the base station to scan for a random access message at a particular time relative to the measurement gap or the time value.

11. The method of claim 10, wherein the base station is configured to scan for the random access message at two or more times.

12. The method of claim 8, wherein configuring the random access procedure comprises configuring the user equipment to transmit a random access message at two or more times.

13. The method of claim 8, wherein the information identifying the first time offset is first information identifying one first time offset for a first beam and wherein the information identifying the second time offset is first information identifying one second time offset for the first beam, and wherein the random access procedure is a first random access procedure, and
   wherein the method further comprises:
      receiving second information identifying another first time offset for a second beam;
      configuring a second random access procedure with regard to the second beam based at least in part on another second time offset; and
      providing information identifying the second time offset for performance of the second random access procedure.

14. The method of claim 13, wherein the second random access procedure is configured between the base station and the user equipment.

15. The method of claim 13, wherein the base station is a first base station, and wherein the second random access procedure is configured between the user equipment and a second base station.

16. The method of claim 8, wherein the base station is a target base station for a handover of the user equipment.

17. The method of claim 8, wherein the information identifying the second time offset is provided in a handover message.

18. The method of claim 8, wherein the scheduling entity is the base station.

19. The method of claim 8, further comprising:
   determining a third time offset between the second time and a fourth time at which a reference signal is to be transmitted by the base station; and
   providing information identifying the third time offset to the base station and the user equipment.

20. A user equipment for wireless communication, comprising:
   a memory; and
   one or more processors operatively coupled to the memory, the memory and the one or more processors configured to:
      provide information identifying a first time offset between a first time associated with a measurement performed by the user equipment and a second time associated with a measurement gap or a time value of a serving cell of the user equipment;
      receive information identifying a second time offset between the second time and a third time, wherein the second time offset is based at least in part on the first time offset,
         wherein the information identifying the second time offset identifies a periodicity for a random access message; and
      transmit the random access message at the third time based at least in part on the second time offset.

21. The user equipment of claim 20, wherein the time value is based at least in part on at least one of a frame timing, slot timing, or symbol timing of the serving cell.

22. The user equipment of claim 20, wherein the first time offset is based at least in part on a sub-symbol timing difference between the first time and the second time.

23. The user equipment of claim 20, wherein the information identifying the second time offset is received in a handover command.

24. The user equipment of claim 20, wherein the information identifying the second time offset identifies a format for the random access message.

25. The user equipment of claim 20, wherein the one or more processors are further configured to:
receive information identifying a third time offset between the second time and a fourth time at which a reference signal is to be received; and
scan for the reference signal at the fourth time based at least in part on the third time offset.

26. A scheduling entity for wireless communication, comprising:
a memory; and
one or more processors operatively coupled to the memory, the memory and the one or more processors configured to:
receive information identifying a first time offset between a first time associated with a measurement regarding a beam received by a user equipment and a second time associated with a measurement gap or a time value of a serving cell of the user equipment;
configure a random access procedure for a base station that provides the beam based at least in part on the first time offset,
wherein the random access procedure is configured to cause the random access procedure to be performed after a second time offset that is based at least in part on the first time offset; and
provide information identifying the second time offset to the user equipment for performance of the random access procedure,
wherein the information identifying the second time offset identifies a periodicity for a random access message.

27. The scheduling entity of claim 26, wherein the one or more processors, when configuring the random access procedure, are further to:
configure the base station to scan for a random access message at a particular time relative to the measurement gap or the time value.

28. The scheduling entity of claim 26, wherein the information identifying the first time offset is first information identifying one first time offset for a first beam and wherein the information identifying the second time offset is first information identifying one second time offset for the first beam, and wherein the random access procedure is a first random access procedure, and
wherein the one or more processors are further to:
receive second information identifying another first time offset for a second beam;
configure a second random access procedure with regard to the second beam based at least in part on another second time offset; and
provide information identifying the second time offset for performance of the second random access procedure.

29. The scheduling entity of claim 28, wherein the second random access procedure is configured between the base station and the user equipment.

30. The scheduling entity of claim 28, wherein the base station is a first base station, and wherein the second random access procedure is configured between the user equipment and a second base station.

\* \* \* \* \*